Aug. 14, 1951  S. L. GILLESPIE  2,563,834
SAFETY CONTROL FOR PRIME MOVERS
Filed May 28, 1945  3 Sheets-Sheet 1

INVENTOR
Sidney Lockwood Gillespie
By Carlson, Pitzner, Hubbard & Wolfe
ATTORNEYS Aug. 14, 1951      S. L. GILLESPIE      2,563,834
SAFETY CONTROL FOR PRIME MOVERS
Filed May 28, 1945      3 Sheets-Sheet 2

INVENTOR
Sidney Lockwood Gillespie
ATTORNEYS

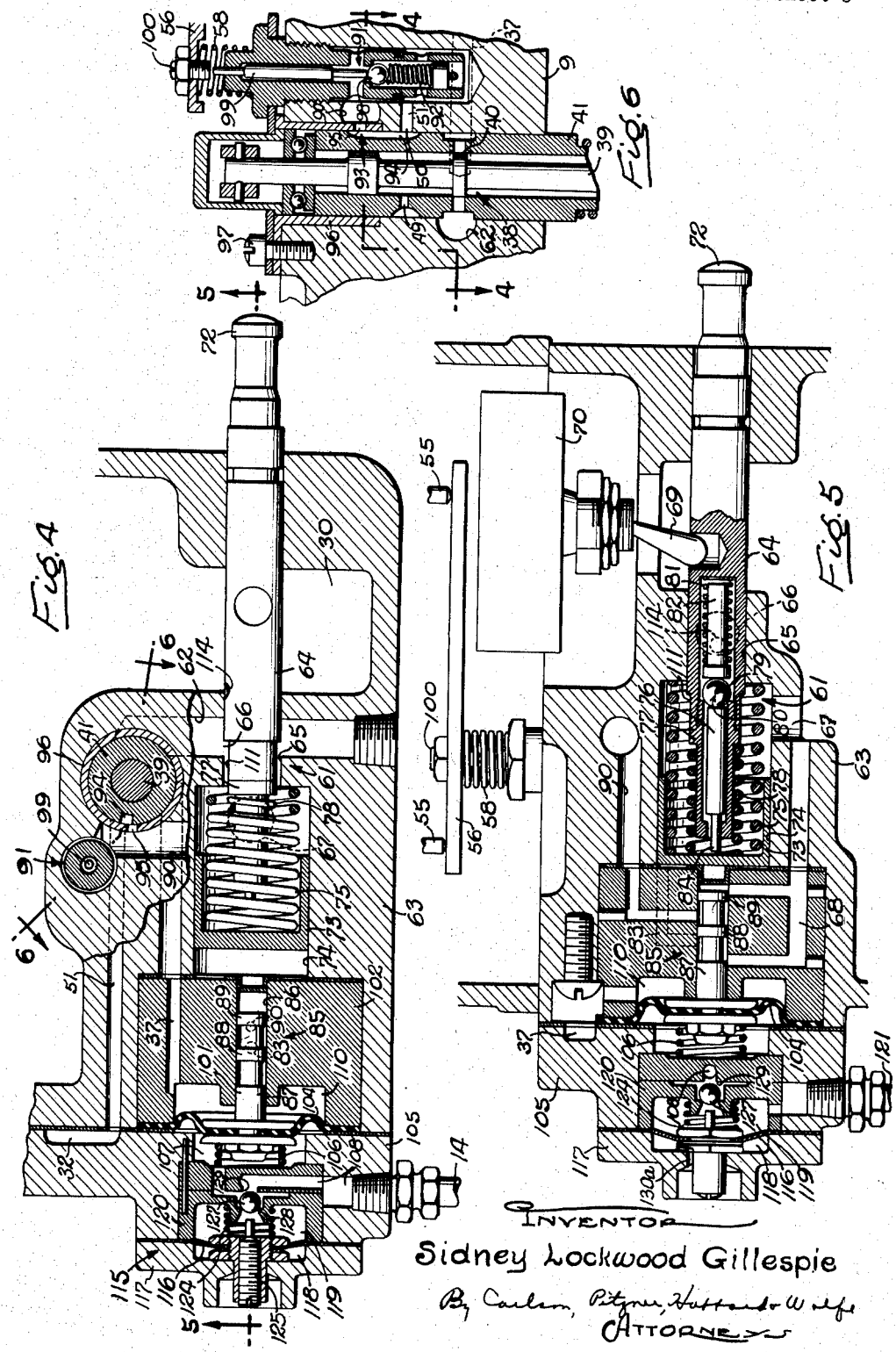

Patented Aug. 14, 1951

2,563,834

UNITED STATES PATENT OFFICE 2,563,834

SAFETY CONTROL FOR PRIME MOVERS

Sidney Lockwood Gillespie, Rockford, Ill., assignor to Woodward Governor Company, Rockford, Ill., a corporation of Illinois Application May 28, 1945, Serial No. 596,302

24 Claims. (Cl. 184—6)

This invention relates to the control of a prime mover such as an internal combustion engine so as to avoid damage in the event that the lubricant supply becomes inadequate.

One object is to provide for automatically reducing the speed of the prime mover in response to failure of the lubricant supply while varying the point of speed reduction in accordance with the engine speed in a novel manner.

Still another object is to prevent such shutdown in selected instances if the lubricant supply failure is only temporary.

Another object is to condition the shutdown mechanism automatically so as to allow normal starting of the prime mover, when usually no lubricating oil pressure exists, but to shut down the prime mover in case pressure is not established in a predetermined interval.

A further object is to allow manual restarting of the prime mover following failure of the lubricant supply but to shut down the prime mover in the event that proper lubricant pressure is not re-established within a reasonable time.

Still another object is to shut the prime mover down in case the vacuum on the lubricating oil pump inlet becomes excessive due to any cause thus anticipating a subsequent failure of pressure.

Another object is to provide for testing of the shutdown mechanism to determine whether it is in proper working order.

Another object is to positively prevent the shutdown mechanism from being mechanically or manually blocked in such a manner that it cannot perform its shutdown function.

The invention also resides in the novel structural character of the means for carrying out the foregoing objects.

Other objects and advantages of the invention will become apparent from the following detailed description taken in connection with the accompanying drawings, in which:

Fig. 4 is a fragmentary sectional view taken along the line 4—4 of Fig. 6.

Figure 1:
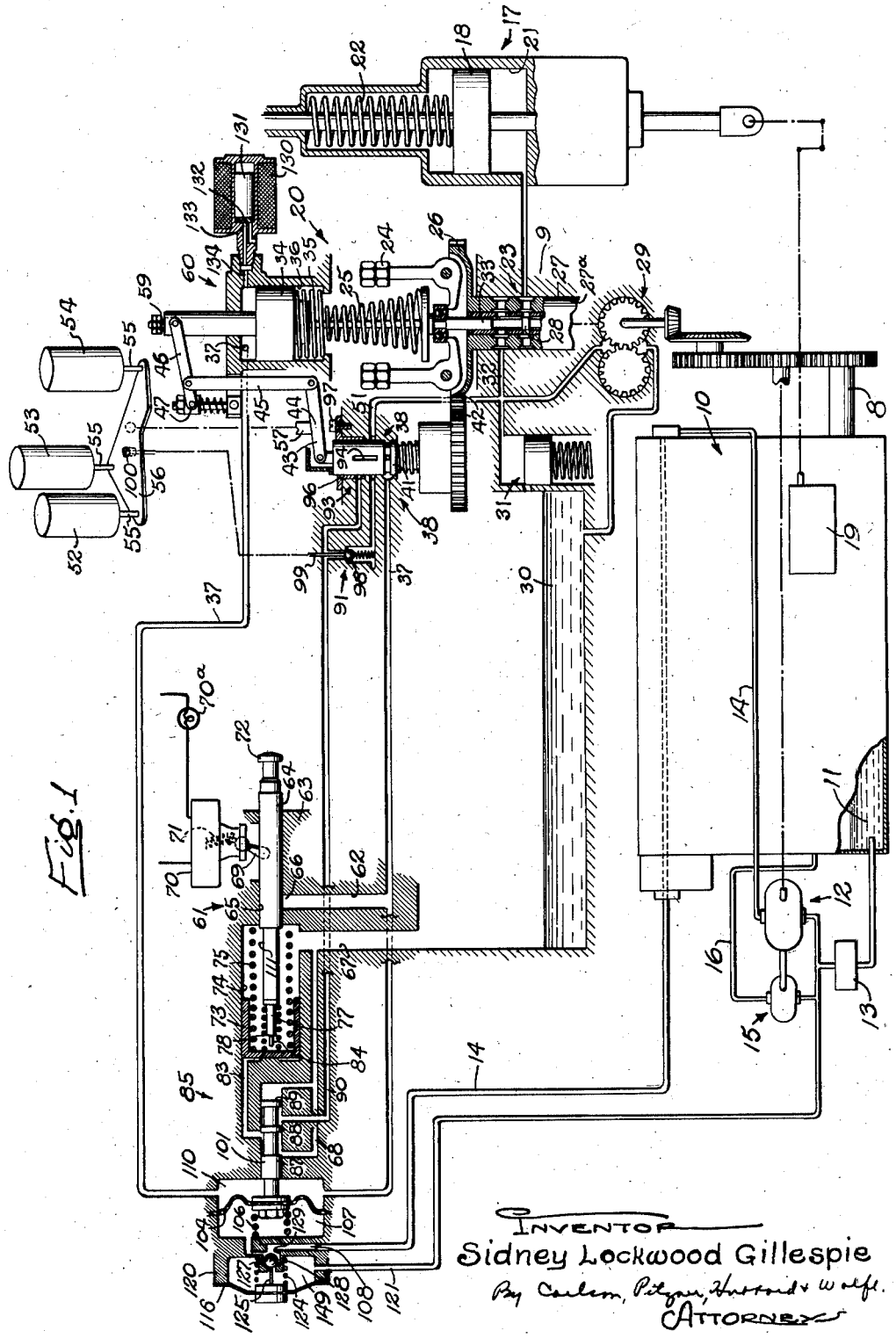
Figure 1 is a schematic view and hydraulic circuit diagram of a prime mover control embodying the present invention.

Figs. 5 and 6 are fragmentary sectional views taken respectively along the lines 5—5 and 6—6 of Fig. 4.

The improved safety control is particularly adapted for use in connection with a prime mover of the internal combustion type indicated at 10 in which lubricating fluid drawn from a sump 11 through the usual filter 13 is placed under pressure by an engine driven pump 12 and delivered through piping 14 and suitable branches therefrom leading to different parts of the engine to be lubricated in accordance with standard practice. In this instance, a second smaller gear pump 15 also driven by the engine draws oil from the same source and delivers the same through piping 16 to the engine pistons or other parts which are to be oil cooled.

While shutting down of the engine may be effected in any preferred way, it is accomplished in the illustrated embodiment through the intermediary of a power servo 17 which actuates the throttle or fuel supply controller 19 of the engine and is normally under the control of a governor 20 which may be adjusted selectively to vary the engine speed maintained during normal engine operation. Herein, the operating parts of the governor and the associated modifying controls are incorporated in and supported by a frame casting 9 which also forms a housing for these parts. The servo is of the fluid pressure type comprising a piston 18 slidable in a cylinder 21 and urged by a spring 22 in a direction to decrease the speed of the engine whose fuel controller is connected through suitable linkage to the piston rod. The flow of pressure fluid to and from the servo cylinder is controlled by a valve 23 actuated in the usual way in response to changes in the engine speed producing motion of flyballs 24 driven by the engine to derive a centrifugal force that is balanced against the force of a speeder spring 25. The flyballs are pivoted on a head 26 on the upper end of a ported drive sleeve 27 which cooperates with a land 28 to form the valve 23 and is driven from the engine crankshaft 8 through a rotary connection extending to the lower end of the sleeve. This sleeve, which is journaled in a bore 27ª in the casting 9, also drives a gear pump 29 which draws oil from a separate sump 30 and cooperates with a spring loaded by-pass valve 31 to supply fluid at substantially constant pressure through a passage 32 to the valve 23. The stem 33 of the latter is connected to the flyballs and the valve is operated in the usual way to admit fluid to or permit drainage from the cylinder 21 so that the servo is variably energized in accordance with load changes and the fuel supply is adjusted to maintain the engine speed constant at the governor setting. The governor and the servo controlled thereby are of standard construction as shown in Patent No. 2,117,891 to which reference may be had for further details.

Variation in the loading of the speeder spring 25 to change the speed setting of the governor is effected in the present instance by an auxiliary fluid servo 60 comprising a piston 34 which bears against the upper end of the speeder spring and is urged upwardly by a spring 35 and the speeder spring 25. The piston slides in a closed cylinder 36 to and from which pressure fluid flows through a passage 37 which, in the present instance, is formed in part by a chamber 110 to be described later. This flow of fluid is under the control of a valve 38 (Figs. 2 and 6) comprising a stem 39 having a land 40 thereon and cooperating with ports in a sleeve 41 rotated in unison with the engine through gears 42. The valve stem 39 is urged upwardly by a spring 39ª on the mounting stud of one of the gears 42 and connected to one end of a lever 43 pivoted intermediate its ends on a fulcrum pin 44. The other end of the lever is connected to the adjusting piston 34 through a follow-up linkage including a link 45 and a lever 46 pivoted at 47 and connected at the other end to the projecting rod 48 of the piston.

To limit the rate at which the speed setting of the governor may be changed, the rate of oil flow to the valve 38 is restricted by making the flow intermittent. This is accomplished herein by a port 49 extending through the rotating sleeve 41 and adapted to register during only a small part of each revolution of the sleeve with a port 50 at the end of a supply line 51 branching from the main line 32.

The speed-adjusting control valve 38 may be actuated manually or by any desired remotely controlled mechanism when it is desired to change the engine speed. Herein such actuation is effected by energizing a plurality of solenoids 52, 53, 54 (Figs. 1 and 2) in different combinations. Rods 55 connected to the armatures of these solenoids bear against the corners of a triangle formed by a plate 56 urged upwardly by a spring 58. Within the triangle, a lug 57 projects from the under side of the plate and carries the fulcrum 44 of the lever 43.

If, for example, the solenoids are energized in a combination to move the fulcrum 44 downwardly, the lever 43 fulcrums about 43ª and the valve land 40 is similarly moved downwardly past its cooperating port 40ª thereby admitting to the conduit 37 pressure fluid supplied periodically through the rotating port 49. This fluid flow into the cylinder 36 forces the piston 34 downwardly to compress the speeder spring further and increase the governor speed setting. As the piston moves, the follow-up linkage 45, 46 swings the lever 43 about the fulcrum 44 until the valve land 40 is restored to its neutral position. Similar action takes place in response to reverse or upward movement of the lever fulcrum 44 by the solenoids, in which case the land 40 is raised, allowing fluid to flow out of the cylinder 36 and the piston 34 to rise, this flow being through the passage 37 and the valve 38 from which the fluid is discharged into a sump area through the open lower end of the sleeve 41. In the present instance, the arrangement is such that with all of the solenoids de-energized, the governor is set for maintaining operation of the engine at idling speed, progressively increasing speeds being obtained by energization of the solenoids individually or in different combinations.

The governor controlled valve 23 and the servo 17 afford a convenient means of effecting normal stopping of the prime mover under manual control or of partially or completely shutting down the prime mover automatically when the lubricant supply becomes inadequate. Complete shutdown may be accomplished by raising the valve land 28 high enough to maintain the valve open continuously, thereby de-energizing the servo 17 and allowing the fuel control linkage to move to shutdown position. To this end, the valve stem 33 is extended upwardly through the speeder spring, the piston 34, and the end of the cylinder 36 and is provided with an abutment 59 by which the valve stem may be lifted against the force of the speeder spring and held open as long as desired.

The speed-adjusting servo 60 is utilized conveniently to effect such lifting which takes place under the force of the spring 35 when this servo is de-energized. Such de-energization to effect normal stopping of the engine may be produced by de-energization of a solenoid 130 which is maintained energized during normal operation of the prime mover. The armature 131 of this solenoid carries a valve element 132 which, when the solenoid is energized, closes a port 133 communicating through a passage 134 with the upper end of the cylinder 36. By controlling the energization of the solenoid, the prime mover may be started and stopped at will under normal operating conditions.

De-energization of the servo 60 and shutdown of the engine may also be effected by opening a normally closed valve 61 which when opened, connects a branch 62 of the servo supply line 37 to the sump 30. This valve and its associated operating mechanism or fluid servo are mounted in a casing 63 secured to the governor casting 9 adjacent the valve 38. In the form shown, the valve comprises a hollow plunger 64 slidable in a bore 65 to cover (Figs. 1 and 5) or uncover (Fig. 4) a port 66 which is the terminus of the branch conduit 62. When the port is uncovered, the passages 37 and 62 are connected to a passage 67 leading to the sump 30.

To enable the valve 61 to be opened with a quick snap action, the plunger 64 is connected to the arm 69 of a toggle signal switch 70 whose spring 71, when the arm is moved over-center, quickly shifts the plunger to the valve-open position shown in Fig. 4, the valve 61 remaining closed until this quick action occurs. Simultaneously the switch actuates the signal circuit to give indication of the shutdown. Closure of the valve is effected by manually pushing inwardly on the end 72 of the plunger 64 which projects outwardly from the casing 63. When the arm 69 is thus moved over-center reversely, the spring 71 moves the plunger to the valve-closed position.

Movement of the plunger 64 or shutdown control member toward the over-center position in the valve opening direction is effected by a power actuator whose movable element has a lost motion one-way connection with the plunger so that movement of the plunger to shutdown position takes place when the actuator becomes energized to a predetermined degree. Herein, the actuator is of the hydraulic type progressively energized by the admission of pressure fluid thereto from the independent source or governor pump. As shown, the actuator comprises a hollow piston 73 slidable in a cylinder 74 and urged toward the closed end of the latter by a compression spring 75. The connection with the valve plunger 64 includes a stem 76 slidable in a cap 77 screw threaded into the end of the plunger and forming a seat for a compression spring 78 which bears against the piston. The stem projects from one end of the cap for engagement by the piston and the other end bears against the ball 79 (Fig. 5) of a valve 80 which is normally held closed by a spring 81 acting between the plunger 64 and the head of a rod 82 bearing against the ball 79 and normally holding the latter against its seat on the end of the cap 77. Thus, as pressure fluid is delivered through a passage 83 to the cylinder 74, the piston 73 moves to the right (Fig. 4) and, after taking up the lost motion, engages the end 84 of the stem 76. Since the spring 81 is stronger than the switch spring 71, the valve 80 remains closed and the stem 76, the cap 77 and the plunger 64 move as a unit until the arm 69 moves over-center, whereupon the plunger snaps forwardly ahead of the piston to open the valve 61.

The admission of pressure fluid from the supply line 32 to the passage 83 and the valve actuator is controlled by a valve 85 comprising a plunger 101 slidable in a bore 86 in a block 102 held in the casting 63 by a cap 105. The plunger carries lands 87, 88, and 89 cooperating with ports at the ends of the drain passages 68, the passage 83 and a passage 90. The latter may be connected to the supply line 32 through a by-pass check valve 91 normally closed by a spring 92 and adapted when open to connect the passage 90 directly to the line 32 (see Fig. 2). Or the passage 90 may be supplied at a slower metered rate through a rotary valve 93 (Figs. 2 and 3) comprising a longitudinal slot 94 in the rotating sleeve 41 adapted to register with the supply port 50 for a small part of each revolution. During part of such registration, the slot also registers with a port 95 in a bushing 96 surrounding the sleeve and in continuous communication with the passage 90. By loosening a clamping screw 97, the bushing may be adjusted angularly to vary the extent of simultaneous register of the ports 50 and 95 with the slot 94 and therefore the average rate of supply of pressure fluid to the cylinder 74 when the valve 85 is in open position.

For a purpose to appear later, the by-pass valve 91 is actuated in accordance with the prevailing speed of the engine, being closed at or below one selected speed and opened above such speed. This may be accomplished conveniently by connecting the ball member 98 of the valve to the triangular plate 56 through a slidable rod 99 bearing at one end against the ball and at the other end against a screw 100 fastened adjustably on the plate 56. Thus, when the plate is pushed downwardly beyond a predetermined position, the valve 91 will be opened, but at all higher positions of the plate and therefore lower speed settings of the governor, the valve will be closed. Usually this predetermined position is the idling speed position in which none of the solenoids 52 is energized but obviously any desired higher speed may be selected by adjustment of the screw 100.

By controlling the opening and closing of the by-pass valve 91 in this manner, it will be apparent that the rate of response of the primary shutdown mechanism including the valve 61 is varied automatically in accordance with changes in the prevailing speed of the prime mover. This rate is slower at the low engine speeds.

In accordance with the present invention, the valve 85 is opened in response to a fall in the pressure of the lubricant supply to the engine below a predetermined safe value, and such value is preferably varied automatically with the engine speed so that an adequate supply of oil is available at any speed without danger of shutting down the engine unnecessarily when operating at lower speeds when a lower lubricating oil pressure is permissible and usually exists. For this purpose, the projecting end of the plunger 101 of the valve 85 is fastened to the center of a movable wall in the form of a diaphragm 104 clamped by a cap 105 against the block 102 and urged in the valve closing direction by a compression spring 106. The chamber 107 on the outer side of the diaphragm communicates through a passage 108 with the far end of the lubricating oil supply conduit 14 and therefore with the lowest pressure part of the lubricating system so that holding of the valve 85 in closed position is dependent on the maintenance of this pressure above a predetermined minimum value, usually five pounds per square inch.

To adjust the value of the lubricating oil pressure at which the engine will be shut down, advantage is taken of the fact that the fluid pressure by which the governor adjusting servo 60 is energized determines, and therefore is substantially proportional to, the prevailing engine speed. Accordingly, this pressure is applied to the chamber 110 on the inner side of the diaphragm 104 by connecting the chamber to the servo supply passage 37. The oil pressure in the chamber 110 varies from about nine pounds per square inch at the idle speed setting to about nineteen pounds at the full speed setting. Under normal operating conditions, the lubricating oil pressure is considerably higher so that such pressure, together with the force of the spring 106 overcomes the speed adjusting pressure in the chamber 110 and holds the valve 85 closed as shown in Fig. 5. Then the passage 83 is connected to the drain passage 68 and the passage 90 is disposed between the valve lands 88 and 89.

Now, if the lubricating oil pressure falls below a value predetermined by the existing pressure in the chamber 110, the latter pressure will overcome the spring 106 and the reduced oil pressure and move the plunger 101 to the left, as shown in Fig. 4, thereby connecting the passages 83 and 90 so as to allow fluid from the independent pressure supply line 32 to flow to the cylinder 74. If the flow persists, the piston 73 will eventually reach a position to effect tripping of the valve 61 to open position followed by de-energization of the servo 60 and raising of the governor valve to de-energize the servo 17 and thereby shut down the engine. The lubricating oil pressure at which such shutdown takes place varies progressively from about five pounds per square inch at idle speed of the engine to about fifteen pounds at high speed, the pressures thus selected and determined primarily by the scale of the spring 35 being such as to provide adequate engine lubrication. By such variation of the shutdown pressure, the pressure required for proper lubrication of the engine at the higher speeds may be obtained without the possibility of stopping the engine at the lower speeds when lower pressures then prevailing in the lubricating system will afford adequate lubrication.

It will be observed that when the engine is operating idly or at some low speed depending on the setting of the valve 91, the flow of oil to the cylinder 74 through the opened valve 85 will be at a low average rate, thereby introducing a short time delay between the reduction in lubricating oil pressure and the eventual tripping of the valve 61. Therefore, if the objectionable pressure reduction is only temporary, as is sometimes the case particularly at lower engine speeds, shutdown will not occur. That is to say, the pressure responsive device is rendered insensitive to short or only temporary decreases in lubricating oil pressure.

At higher engine speeds, the valve 91 is held open by the depression of the speed adjusting plate 56. Thus, when the lubricating oil pressure falls below the value for which the shutdown mechanism is responsive, the flow of oil through the valve 85 is continuous and the valve 61 is tripped almost immediately, thereby avoiding any possibility of damaging the engine under the more severe operating conditions.

As an incident to shutdown of the engine following failure of the lubricating oil supply, the automatic pressure responsive valve 85 is reset automatically so as to permit restarting of the engine under manual control after the cause of the failure has been removed. Such resetting is effected by reduction of the pressure in the chamber 110 to zero as an incident to shutdown and by the provision of the spring 106 which is thereby rendered active to move the plunger 101 reversely and to the right to again close the valve 85 and connect the cylinder 74 to the drain. The pressure reduction in the chamber 110 is effected by the valve 61, whose plunger 64 has a reduced diameter 111 which is presented to the bore 65 when the plunger is shifted to open position (Fig. 4). In this position, the annular passage around the reduced plunger diameter connects the passage 37 to the drain 67 through the passage 62. Thereupon, the diaphragm 104 and the valve plunger 101 are moved to the position shown in Figs. 1 and 5 by the spring 106 and the piston 73 is returned by its spring 75.

To again render the governor active to permit the delivery of fuel for starting the engine, it is only necessary to close the valve 61 by manually pushing inwardly on the plunger knob 72 to a position limited by engagement of the rod 82 with the end wall of the plunger recess and of the rod end 84 with the head of the piston 73. This throws the switch arm 69 reversely overcenter closing the port 66 of the valve 61. Thereupon, the escape of fluid from the cylinder 36 is interrupted and the speed adjusting servo 60 is reenergized to the value of the prevailing selected speed setting, thereby building up a corresponding pressure in the chamber 110. If the cause of the lubricating oil pressure failure has been removed, the pressure built up in the chamber 107 by operation of the engine oil pump 12 will overcome the pressure in the chamber 110 and the valve plunger 101 will remain in its reset or closed position, normal engine operation then continuing. If, however, the proper lubricating oil pressure is not attained after an interval predetermined by the adjustment of the sleeve 96, the pressure responsive valve 85 will be opened and the fuel supply will again be disabled in the same manner previously described.

A careless operator of the prime mover may, after a shutdown due to lubricating oil failure, restart the engine and attempt to maintain it operating by forcibly holding the plunger 64 inwardly. To prevent such continued operation if the lubricating oil pressure continues to be inadequate, there is provided an auxiliary shutdown which is responsive to the shutdown operation of the pressure responsive valve 85 whenever the valve plunger 64 is held inwardly. This means includes the auxiliary valve 80 (Fig. 5) which, when opened by movement of the ball 79 against the action of the spring 81, connects the passage 62 and therefore the chamber 110 with the drain passage 67. For this purpose, the hollow end portion of the plunger 64 is provided with a hole 114 (Figs. 4 and 5) which, when the plunger 64 is pushed inwardly to starting position (Fig. 5), registers with the port 66. Now, if due to a fall in oil pressure, the valve 85 is moved to admit fluid behind the piston 73, the latter will engage and move the stem end 84 and unseat the ball 79 even though the plunger 64 is manually held inwardly. Fluid is thus permitted to flow to the drain from the passage chamber 110, through the passage 62, the ports 66 and 114, the interior of the plunger 64, the then open valve 80, the interior of the cap 77, and out the end of the latter. The speed adjusting servo is thus de-energized and the engine fuel supply is cut off while the valve plunger 64 remains in its inner position.

In internal combustion engines, particularly those employing both lubricating and cooling pumps, damage may occur as a result of partial clogging of the filter 13 and the consequent reduction in the oil supply to the lower capacity pump. Such a condition is detected by an auxiliary differential pressure responsive device 115 (Figs. 4 and 5) comprising a diaphragm 116 clamped by a cap 117 to the casting 105 in axial alinement with the valve plunger 101. Through a clearance 130ª, a chamber 118 on the outer side of the diaphragm is open to the atmosphere while an inner chamber 119 within a cup 120 is connected through a passage 121 to the common suction line or inlets of the two pumps 12 and 15. A compression spring 124 urges the diaphragm outwardly against the differential in pressure between the atmosphere and the normal pump intake pressure, thereby holding the diaphragm in the position shown in Figs. 4 and 5 with the inner end of an adjustable pin 125 on the diaphragm out of contact with a ball 127. The latter is therefore normally held in its seat 128 by the pump discharge pressure in the chamber applied to the pasage 108. When the pump intake pressure falls below an abnormal value indicative of a restriction in the fluid passages leading to the pumps and predetermined by the scale of the spring 124 and the setting of the pin 125, the diaphragm moves under atmospheric pressure to unseat the ball 127 and connect the space 107 to the inlet side of the pumps. In the same motion, the ball 127 moves against a seat 129 thereby interrupting communication between the passage 107 and the pressure side of the lubricating system. Such operation of the three way ball valve has the same effect as an abnormal reduction in the lubricant supply pressure so that the valve 85 is actuated in the manner previously described to shut down the prime mover. When the restriction or other cause of the high pump vacuum is removed, the diaphragm 116 will be forced outwardly and the ball 127 will be allowed to close against the seat 128, again rendering the main shutdown control valve 85 effectual.

The valve 127 of the vacuum responsive shutdown control affords a convenient means of testing the operativeness of the safety shutdown control so that the operator may be sure that the control stands ready to perform when an emergency arises. To effect such a test, it is only necessary to manually push inwardly on the outer end of the plunger 125 while the engine is running. As above described, this disconnects the lubricating pressure line 14 from the chamber 107 and allows the latter to drain into the vacuum side of the oil pumps thereby producing a false reduction in the pressure to which the valve 85 responds and causing eventual movement of the plunger knob 72 outwardly to shut down the engine. When the plunger 125 is allowed to move outwardly to normal position under the action of the spring 124, the shutdown mechanism is again conditioned for operation.

Figures 2, 3:
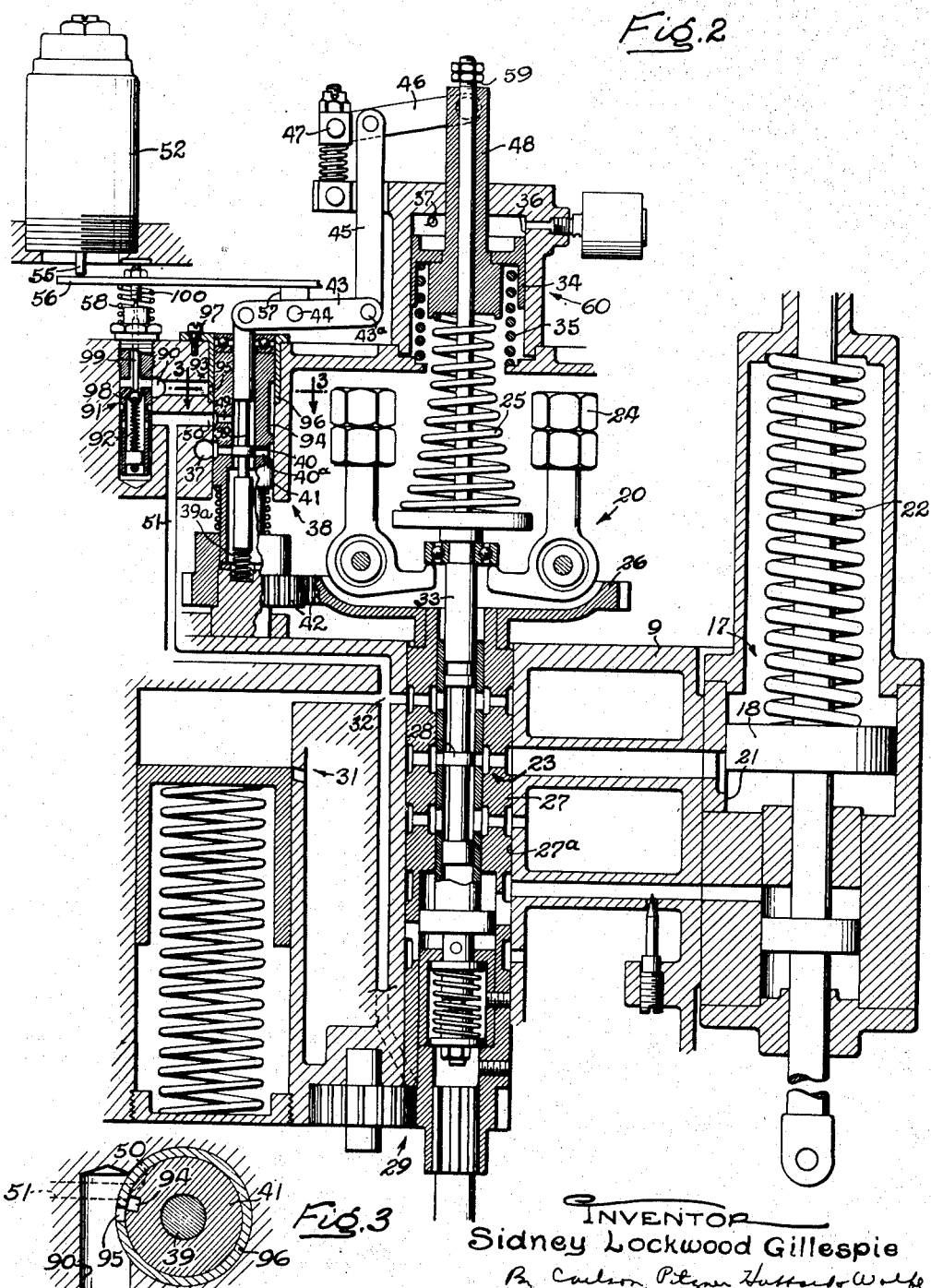
Fig. 2 is a diametrical sectional view partially diagrammatic of the prime mover governor.
Fig. 3 is a fragmentary section taken along the line 3—3 of Fig. 2.

When the prime mover has been shut down in the normal way or by de-energizing the solenoid 130, the pressure in the lubricating system of course becomes dissipated. The present control provides a means for maintaining the shutdown mechanism ineffectual until normal lubricating oil pressure has been attained. In the present instance, this means is formed by the valve 93 which, when the valve 85 is open, meters the supply of pressure fluid from the governor pump to the cylinder 74 thereby interposing a time delay in the movement of the plunger 64 over center to open the shutdown control valve 61. When the engine is started following a normal shutdown, the governor will, by de-energization of the solenoids 52, 53 and 54, be set for idling speed so that the valve 91 will be closed and pressure fluid from the governor pump will be supplied to the passage 90 intermittently, that is, during registry of the ports 94 and 95 (Fig. 3). Therefore, even though governor pump pressure builds up in the chamber 110 ahead of the pressure in the lubricating system and the chamber 107, the shutdown valve 61 will not respond immediately. Instead fluid will be delivered to the cylinder 74 through the valve 85 at such a slow rate that a period of some forty seconds of such flow is required before the valve 61 will be tripped. During this interval when the shutdown device is maintained ineffectual, the proper lubricating oil pressure will normally be attained and the valve 85 will be reclosed to interrupt the shutdown action and permit continued operation of the prime mover but with the shutdown mechanism conditioned for action in the intended manner.

It will be observed that the ability of the control apparatus to maintain the shutdown mechanism ineffectual during normal starting is conditioned upon the engine being set for idle operation, as is desirable. That is to say, if the governor is set for any speed above idle, the by-pass valve 91 will be opened permitting fluid from the governor pump to flow directly to the cylinder 74 through the then open valve 85 whereupon shutdown will take place immediately. In other words, the shutdown control prevents starting of the engine unless the fuel setting is for idle speed operation.

Through the use of the pressure actuated device 85 responsive to the differential between the lubricating oil pressure and the pressure which corresponds to the prevailing engine speed, failure of the lubricant supply is detected accurately under varying load and speed conditions and shutdown of the prime mover is effected positively through the use of the over-center or trip valve.

Thus, provision is made for optimum safety in controlling the engine under widely varying operating conditions while at the same time avoiding unnecessary shutdowns. The auxiliary controls operating in conjunction with the differentially responsive device contribute to the simplicity and reliability of the safety control without interfering with normal starting and stopping of the engine. Control of the engine is thus rendered foolproof, even when the engine is under the supervision of an unskilled or careless operator.

In installations where automatic shutdown of the prime mover is not required, the differential valve 85 and the associated parts may be utilized simply as a means of detecting a failure of the lubricating oil supply. For this purpose, the shutdown control member or valve plunger 64 above described may be utilized to actuate the switch 70 or other device for lighting a lamp 70a, sounding a horn, or giving the engine operator any desired kind of warning signal. Or, if desired, the switch 70 may be used through other mechanism such as a solenoid valve 130 or the like to effect engine shutdown automatically.

I claim as my invention:

1. In a control for a prime mover having a pressure lubricating system and a source of fluid under pressure variable with changes in the prime mover speed, the combination of means defining two fluid filled chambers respectively connectable with said system and said source, means providing a drain, a valve adapted when open to connect said fluid source to said drain including a member movable to valve-open position with an over-center action, a fluid servo having an actuated element with a one-way connection to said valve member for moving the latter toward valve open position when pressure fluid is admitted to the servo, valve means controlling the admission of the pressure fluid to said servo and a spring urged in the valve-closing direction, and means for actuating said valve means to open the latter in response to a fall in the pressure in said first chamber a predetermined amount below that in the second chamber.

2. In a control for a prime mover having a pressure lubricating system and a fluid filled chamber in which the pressure varies with changes in the speed of the prime mover, the combination of means providing a drain, a valve for connecting said chamber to said drain when open including a member movable to valve-open position with an over-center action, a fluid servo including an actuating element having a one-way connection with said valve member and operable, when pressure fluid is admitted thereto, to move the latter toward valve-open position, a second valve adapted when open to admit pressure fluid to said fluid servo, and means for opening said second valve in response to a fall in said lubricating system pressure a predetermined amount below the pressure in said chamber.

3. In a control for a prime mover having a pressure lubricating system and a source of fluid under a pressure variable with the prime mover speed, the combination of means defining two chambers on opposite sides of a common movable wall, one of said chambers being connectable to said lubricating system and the other being connectable to said source, spring means acting on said wall and urging the same in a direction to reduce the volume of said second chamber, means providing a drain, a valve for connecting said source to said drain including a member movable between open and closed positions with an overcenter action, an actuating element having a one-way connection with said member for moving the latter toward valve-open position whereby to open the valve when the member moves over-center, and means for moving said actuating element in the valve-opening direction in response to a fall in pressure in said first chamber a predetermined amount below that in said second chamber whereby to cause movement of said member over-center to open the valve and thereupon drain said pressure source and said second chamber, said spring means thereupon moving said movable wall reversely.

4. In a control for a prime mover having a pressure lubricating system and a source of fluid under a pressure variable with the prime mover speed, the combination of a servo actuator normally energized and adapted when de-energized to shut down the prime mover, means including a member movable with an over-center action for de-energizing said servo actuator when the member is moved to a predetermined position, an actuating element having a one-way connection with said member for moving the latter toward said position, and means for moving said actuating element in response to a fall in pressure in said lubricating system and the resulting increase in the pressure difference between the system and said source to a predetermined value whereby to cause movement of said member over-center to de-energize said servo.

5. In a control for a prime mover having a pressure lubricating system and a source of fluid under a pressure variable with the prime mover speed, the combination of a member movable with an over-center action, an actuating element having a one-way connection with said member for moving the latter toward a predetermined position, prime mover shutdown means actuated by movement of said member to said position, and means for moving said actuating element in response to a fall in pressure in said lubricating system a predetermined amount below that of said source whereby to cause movement of said member over-center and thereupon effect shutdown of the prime mover.

6. In a control for a prime mover having a pressure lubricating system, the combination of, a member movable back and forth between a normal position and a shutdown position, manually operable means by which said member may be shifted back to said normal position, a valve opened by movement of said member to said shutdown position, mechanism responsive to opening of said valve for effecting a reduction in the speed of an associated prime mover, an actuating element having a lost motion one-way connection with said member, means responding to a reduction in the pressure in said system below a predetermined value and thereupon moving said element in a direction to shift said member toward valve-open position, an auxiliary valve adapted when actuated to operate said shutdown mechanism and cause the latter to reduce the prime mover speed, and means operable to actuate said second valve in response to shutdown movement of said element while said member is held manually in said normal position.

7. In a control for a prime mover having a pressure lubricating system, the combination of, a primary mechanism by which said prime mover may be shut down automatically in response to a reduction in the pressure of said system below a predetermined value, said means including a member movable between a shutdown position and a normal position permitting prime mover operation, manually operable means for moving said member from said shutdown position back to said normal position to reset said mechanism for prime mover operation, and auxiliary mechanism adapted, when rendered active, to shut down the prime mover, and means responsive to a continued reduction of the pressure in said lubricating system combined with simultaneous manual holding of said member in said normal position to actuate said auxiliary mechanism.

8. In a control for a prime mover having a pressure lubricating system, the combination of, a member movable back and forth between a normal position and a shutdown position, manually operable means by which said member may be shifted back to said normal position, means actuated by movement of said member to said shutdown position for effecting shut down of an associated prime mover, an actuating element having a lost motion one-way connection with said member, means for detecting a reduction in the pressure in said system below a predetermined value and moving said element in a direction to shift said member toward said shutdown position, and an auxiliary means for effecting a reduction in the speed of said prime mover in response to the lost motion movement of said actuating element while said member is held manually in said normal position.

9. In a control for a prime mover having a pressure lubricating system, the combination of, mechanism automatically responsive to pressure changes in said system and operable to effect shutting down of said prime mover when the lubricating pressure falls below a predetermined value, said mechanism including a member movable in one direction as an incident to such shutting down of the prime mover, an outwardly exposed element manually actuatable to move said member reversely to a position for resetting said mechanism for response to a fall in the lubricating pressure, and a separately operable mechanism for effecting shutting down of said prime mover while said pressure fall persists and said resetting element remains held in resetting position.

10. In a control for a prime mover having a pressure lubricating system, the combination of, mechanism by which the operation of a prime mover may be shut down, means for actuating said mechanism by the admission of pressure fluid to a servo actuator, valve means responsive to a fall in the pressure in said system below a predetermined value to admit pressure fluid to said servo, and valve means responsive to changes in the speed of said prime mover to vary the rate of said fluid delivery.

11. In a control for a prime mover having a source of lubricating fluid under pressure, the combination of mechanism adapted when actuated to shut down the prime mover, said mechanism including a servo actuator adapted to effect such shut down when energized to a predetermined degree, means for responding to a fall in the pressure of said source below a predetermined value and thereupon increase the energization of said actuator progressively and means for increasing and decreasing the speed of response of said mechanism respectively in accordance with increases and decreases in the prime mover speed comprising mechanism for controlling the rate of the supply of energy to said actuator.

12. A control for a prime mover having, in combination, a fluid servo for starting, stopping, and varying the speed of a prime mover, a valve controlling the energization of said servo, selectively adjustable speed responsive means for actuating said valve, a second fluid servo having a member movable back and forth to vary the adjustment of said speed responsive means in accordance with the energization of the servo and to actuate said valve and de-energize said first mentioned servo when the second servo is de-energized, two chambers having a common movable wall, one chamber communicating with said second servo so as to be energized variably therewith and the other chamber being connectable with a source of pressure fluid, and a valve means actuated by movement of said movable wall and operable to effect de-energization of said second servo in response to a decrease in the pressure in said second fluid chamber and the resulting increase in the pressure difference between the two chambers to a predetermined value.

13. A control for a prime mover comprising a speed controlling governor having an adjustable speed setting, a pressure responsive device having two chambers and a member movable in response to changes in the pressure differential between said chambers, a fluid pressure actuator variably energized and communicating with one of said chambers, means for connecting the other of said chambers to a source of fluid at a control pressure, and means for adjusting the speed setting of said governor in accordance with the degree of energization of said actuator.

14. In a control for a prime mover having a lubricating system, the combination of, a speed controlling governor having an adjustable speed setting, a pressure responsive device having two chambers and a member movable in response to changes in the pressure differential between said chambers, a pressure actuated means variably energized to change the speed setting of said governor and communicating with one of said chambers, the other chamber being charged from said lubricating system, and an auxiliary means actuated by movement of said member and controlling the energization of said pressure actuated means.

15. In a control for a prime mover having a pressure lubricating system, the combination of, a controller selectively adjustable back and forth to cause operation of the prime mover at different speeds corresponding to the controller position, a fluid filled space, means including a valve responsive to changes in the position of said controller to vary the pressure in said space in proportion to the controller position, means defining two fluid filled chambers including a wall movable in response to changes in the pressure differential between said chambers, means connecting one of said chambers to said fluid space to thereby vary the chamber pressure in accordance with changes in the position and speed setting of said controller, the other chamber being charged from said lubricating system, and means responsive to a decrease in the pressure in said second fluid chamber and operable to detect a resulting increase in the pressure difference between the two chambers to a predetermined value.

16. In a control for a prime mover having a pressure lubricating system, the combination of, means for adjusting the prime mover speed including a member movable from an idling speed position to increase the prime mover speed, mechanism adapted when associated with said lubricating system to respond to pressure changes therein and cause shutdown of the prime mover when the pressure falls below a predetermined value, and a device actuated by movement of said speed adjusting member and operable automatically during normal starting of the prime mover when said speed adjusting member is in said idling speed position to maintain said shutdown mechanism ineffectual for a time interval of sufficient duration to permit the pressure in said system to rise above said predetermined value.

17. In a control for a prime mover having a pressure lubricating system, the combination of, means providing a separate source of fluid under pressure, a fluid pressure actuator having a movable element, pressure responsive valve means actuated by pressure fluid from said system and operable in response to a fall in pressure therein below a predetermined value to admit fluid from said source to said actuator, means operable upon movement of said actuator element to a predetermined position to effect shutdown of the prime mover, and means for metering the flow of fluid to said actuator through said valve means to delay shutdown of the prime mover following response of said valve means for a time interval greater than the interval required for the lubricating system pressure to attain said predetermined value during normal starting of the prime mover.

18. In a control for a prime mover having a pressure lubricating system, the combination of, shutdown mechanism including a fluid pressure actuator, means for admitting pressure fluid to said actuator in response to a fall in the pressure in said system below a predetermined value, and means for metering the flow of fluid to said actuator including two coacting valve parts relatively rotated by said prime mover, said parts having holes therein adapted to register and pass fluid to the actuator during only a small part of each revolution of relative rotation.

19. In a control for a prime mover having a pressure lubricating system, the combination of, prime mover shutdown mechanism, a power actuator therefor adapted to actuate the mechanism and cause shutdown when the actuator is energized to a predetermined degree, means operable in response to a fall in the pressure in said system below a predetermined value to initiate energization of said actuator and then increase the energization progressively until said predetermined degree is attained, a device movable to different positions to vary the rate of energization of said actuator, and means operable automatically during normal starting of said prime mover to actuate said device and reduce said rate of energization and thereby delay effective energization of said actuator to said predetermined degree for a time interval sufficient to permit the pressure in said system to attain said predetermined value.

20. In a control for a prime mover having a pressure lubricating system, the combination of, prime mover shutdown mechanism, a power actuator therefor normally deenergized and adapted when energized to a predetermined degree to effect shutdown actuation of said mechanism, means actuated in response to pressure changes in said lubricating system and operable in response to a pressure drop below a predetermined value to energize said actuator and then increase the energization thereof progressively to said predetermined degree while said pressure drop continues, a member selectively movable to vary the speed of the prime mover, a device selectively movable to vary the rate of energization of said actuator, and means connecting said device and said speed adjusting member and operable in response to a speed reducing movement of said member to move said device to a position for reducing the rate of energization of said actuator.

21. In a control for a prime mover having a pump driven thereby to supply fluid under pressure, the combination of mechanism by which the prime mover may be shut down including a chamber communicating with the outlet of said pump and having a movable wall normally urged in one direction and movable in such direction in response to a fall in the chamber pressure below a predetermined value, a valve adapted when opened to release the pressure in said chamber and thereby allow said wall to move and actuate said shutdown mechanism, means defining a second chamber normally communicating with the intake of said pump and having an externally disposed wall urged outwardly but movable inwardly in response to a fall in the chamber pressure below a predetermined value, and means connecting said second wall and the movable element of said valve to open the latter when the pressure in said second chamber falls below said predetermined value.

22. In a control for a prime mover having a pressure lubricating system, the combination of, a speed regulator for the prime mover including a fluid pressure servo operable to increase and decrease the speed setting of the regulator as the energization of the servo is increased and decreased respectively, a fluid pressure actuator, means for supplying pressure fluid to said actuator including a valve, a device responsive to pressure changes in said lubricating system and operable by a fall in pressure below a predetermined value to open said valve and admit pressure fluid to said actuator and then increase the energization of the latter progressively, and means operable in response to an increase in the energization of said actuator to a predetermined degree to release the pressure fluid in said servo and thereby reduce the speed of said prime mover.

23. In a control for a prime mover having a pressure lubricating system, the combination of, a speed regulator for the prime mover including a power actuated servo operable to increase and decrease the speed setting of the regulator as the energization of the servo is increased and decreased respectively, a fluid pressure actuator, a connection for supplying energy to said actuator including a control device responsive to a fall in the lubricating pressure in said system below a predetermined value to initiate energization of said actuator and increase such energization progressively, a second control device adapted when actuated to deenergize said servo and cause shutting down of the prime mover, and means operable in response to an increase in the energization of said actuator to a predetermined degree to effect such actuation of said second control device.

24. In a control for a prime mover having a pump driven thereby to supply fluid under pressure, the combination of mechanism by which the prime mover may be shut down including a passage communicating with the outlet of said pump and a chamber having a movable wall normally urged in one direction and movable in such direction in response to a fall in the chamber pressure below a predetermined value, a valve normally connecting said passage and said chamber, a second valve adapted when opened to release the pressure in said chamber and thereby allow said wall to move and actuate said shutdown mechanism, means defining a second chamber normally communicating with the intake of said pump and having an externally disposed wall urged outwardly but movable inwardly in response to a fall in the chamber pressure below a predetermined value, and means connecting said second wall to the movable elements of said first and second valves and operable to open the second valve and initiate closing of the first valve when the pressure in said second chamber falls below said predetermined value.

SIDNEY LOCKWOOD GILLESPIE.

REFERENCES CITED

The following references are of record in the file of this patent:

UNITED STATES PATENTS

| Number | Name | Date |
|---|---|---|
| 1,173,415 | Day | Feb. 29, 1916 |
| 1,654,220 | Johnstone | Dec. 27, 1927 |
| 1,851,611 | Wernberg | Mar. 29, 1932 |
| 2,099,556 | Carpenter | Nov. 16, 1937 |
| 2,122,049 | Stark | June 28, 1938 |
| 2,176,015 | Severin | Oct. 10, 1939 |
| 2,227,555 | Robison | Jan. 7, 1941 |

FOREIGN PATENTS

| Number | Country | Date |
|---|---|---|
| 490,521 | Great Britain | Aug. 12, 1938 |